(12) United States Patent
Abe et al.

(10) Patent No.: US 10,183,480 B2
(45) Date of Patent: Jan. 22, 2019

(54) SEAL SURFACE CARVING APPARATUS

(71) Applicant: SHACHIHATA INC., Nagoya-Shi (JP)

(72) Inventors: Eiji Abe, Nagoya (JP); Takayuki Mitsuya, Nagoya (JP)

(73) Assignee: Shachihata Inc., Nagoya-shi (JP)

( * ) Notice: Subject to any disclaimer, the term of this patent is extended or adjusted under 35 U.S.C. 154(b) by 172 days.

(21) Appl. No.: 15/404,486

(22) Filed: Jan. 12, 2017

(65) Prior Publication Data

US 2017/0217147 A1   Aug. 3, 2017

(30) Foreign Application Priority Data

Jan. 29, 2016   (JP) .................. 2016-016101

(51) Int. Cl.

| | |
|---|---|
| B41C 1/05 | (2006.01) |
| B41C 1/055 | (2006.01) |
| B29C 35/00 | (2006.01) |
| B29C 35/02 | (2006.01) |
| B41K 1/02 | (2006.01) |
| B41K 1/50 | (2006.01) |
| B41D 1/00 | (2006.01) |
| B41D 7/00 | (2006.01) |
| B29K 105/04 | (2006.01) |
| B29K 105/00 | (2006.01) |
| B29L 31/00 | (2006.01) |

(52) U.S. Cl.
CPC .............. *B41C 1/05* (2013.01); *B29C 35/002* (2013.01); *B29C 35/02* (2013.01); *B41C 1/055* (2013.01); *B41D 1/00* (2013.01); *B41D 7/00* (2013.01); *B41K 1/02* (2013.01); *B41K 1/50* (2013.01); *B29K 2105/04* (2013.01); *B29K 2105/256* (2013.01); *B29L 2031/757* (2013.01)

(58) Field of Classification Search
CPC .................. B41C 1/05; B41C 1/055
See application file for complete search history.

(56) References Cited

U.S. PATENT DOCUMENTS

| | | |
|---|---|---|
| 2014/0020584 A1 | 1/2014 | Abe et al. |
| 2015/0084257 A1 | 3/2015 | Yuno et al. |

FOREIGN PATENT DOCUMENTS

| | | |
|---|---|---|
| EP | 3 048 570 A1 | 7/2016 |
| JP | 2014-043092 A1 | 3/2014 |

OTHER PUBLICATIONS

European Search Report, European Application No. 17153124.7, dated Jun. 8, 2017 (8 pages).

*Primary Examiner* — Timothy Kennedy
(74) *Attorney, Agent, or Firm* — Burr & Brown, PLLC

(57) ABSTRACT

Provides is a seal surface carving apparatus capable of carving a seal surface using only a single attachment irrespective of a size of a stamp. A porous impression die having a seal surface to be carved is set on a dedicated attachment, and is loaded in a seal surface carving apparatus. A fitting projection fit to a bottom portion of the impression die is formed on the attachment, and impression dice having various sizes may be set. In addition, a slit hole extending in a conveyance direction is formed in an impression die setting portion of the attachment. Impression die size determination means of the seal surface carving apparatus determines a size of the impression die by detecting a position at which the impression die blocks the slit hole.

4 Claims, 13 Drawing Sheets

SIDE　　　　　　　　　　　HEAD SURFACE

SIZE 3025

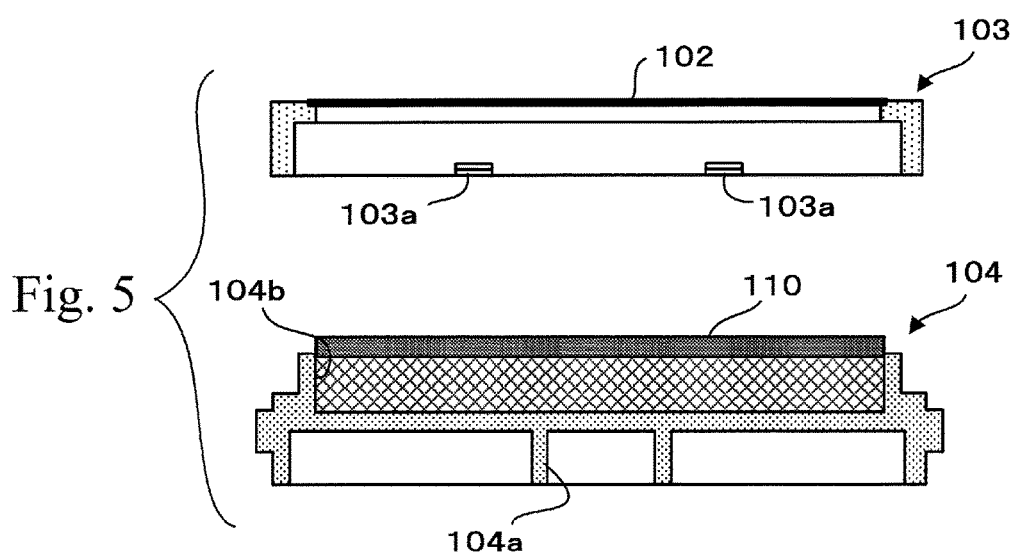

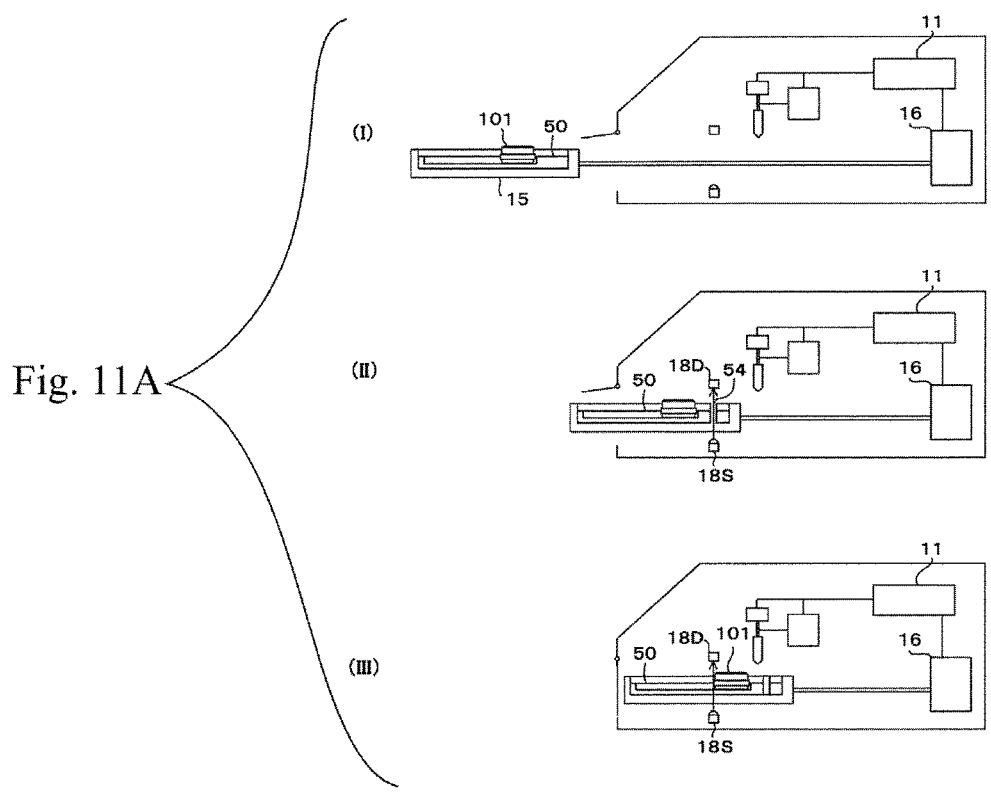

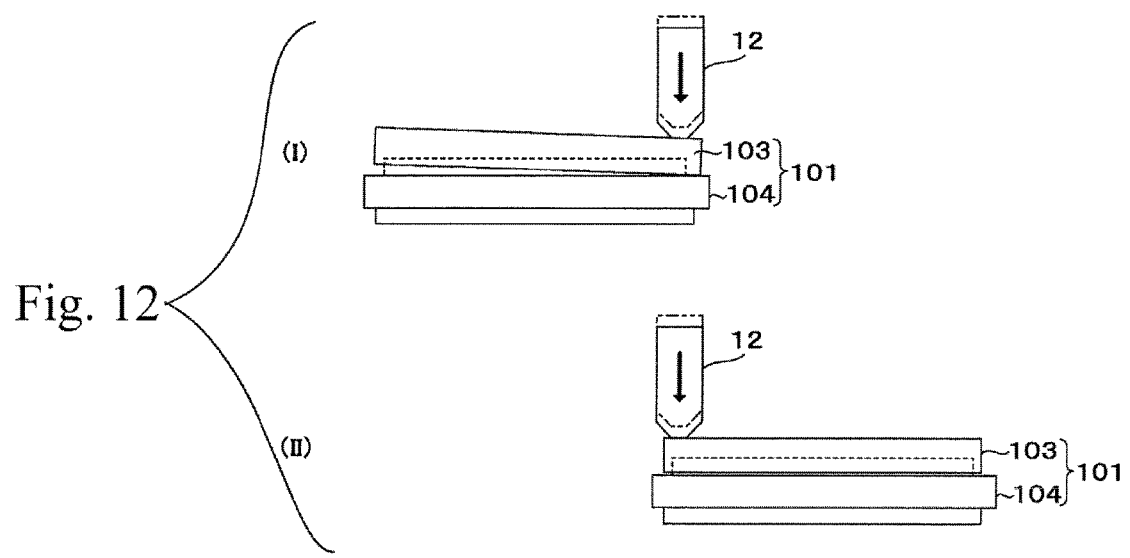

SEAL SURFACE CARVING APPARATUS

BACKGROUND OF THE INVENTION

1. Field of the Invention

The present invention relates to a seal surface carving apparatus that carves a seal surface on an impression die to manufacture a stamp.

2. Description of the Related Art

A seal surface carving apparatus is an apparatus that performs thermal carving process of carving a desired seal surface on an impression die by allowing a thermal head to come into contact with the impression die such as a porous material, and selectively thermally driving a heater element of the thermal head while relatively moving the thermal head and the impression die (for example, see JP 2014-43092 A). A stamp is assembled by installing the impression die, on which the seal surface is carved by the seal surface carving apparatus, in a holder. Recently, the seal surface carving apparatus requires versatility such that stamps of various seal surface patterns may be carved in response to an order from a purchaser, convenience such that everyone may carve a stamp at a store, etc.

SUMMARY OF THE INVENTION

In a conventional seal surface carving apparatus, a plurality of types of attachments corresponding to sizes needs to be prepared in advance in order to be able to respond to stamps having various sizes. When many types of attachments are present as described above, there is a concern that a general user (including a purchaser, a salesclerk, etc. of a stamp) may erroneously load an attachment having a different size.

The invention has been conceived in view of the above-mentioned problem, and an object of the invention is to provide a seal surface carving apparatus that enables a general user to conveniently carve a seal surface without a mistake by allowing only a single attachment to be used irrespective of a size of a stamp.

To solve the above-described problem, the invention is a seal surface carving apparatus including a thermal head having a plurality of heater elements disposed in a line shape, an attachment on which an impression die having a seal surface to be carved is set, conveying means that carries in the attachment to an inside of the apparatus and carries out the attachment to an outside of the apparatus, and control means that carves the seal surface on the impression die by driving the respective heater elements of the thermal head while controlling a relative position between the impression die and the thermal head using the conveying means, wherein a slit hole extending along a conveyance direction inside the apparatus based on the conveying means is formed in the attachment, and a size of the impression die is determined by detecting a position at which the impression die blocks the slit hole.

In the above-described configuration, it is preferable that the seal surface carving apparatus further include an optical sensor serving as detection means that detects the position at which the impression die blocks the slit hole.

In addition, it is preferable that a reference hole be formed on an extension of the slit hole in the attachment, and the optical sensor determine the size of the impression die based on a distance between a first conveyance position at which the reference hole is detected and a second conveyance position at which an end portion of the impression die blocking the slit hole is detected.

In addition, it is preferable that the impression die include a frame body in which a porous membrane is stretched at an opening, and a receiving member that supports the frame body, and a fitting portion fit to a bottom portion of the receiving member be formed on an impression die setting surface of the attachment.

According to a seal surface carving apparatus of the invention, it is possible to carve a seal surface on impression dice having various sizes using only a single attachment. In this way, a plurality of types of attachments need not be prepared in response to sizes of stamps, and convenience or operability may be improved when compared to the past.

BRIEF DESCRIPTION OF THE DRAWINGS

FIG. 4B is a bottom view of an impression die of another example having a different size;

FIG. 4C is a bottom view of an impression die of still another example having a different size;

FIG. 5 is an exploded cross-sectional view of the porous impression die;

FIG. 11A is a diagram for description of an operation by the seal surface carving apparatus;

FIG. 12 is a diagram illustrating pressing means of the porous impression die.

DETAILED DESCRIPTION OF THE PREFERRED EMBODIMENTS

Figure 1:
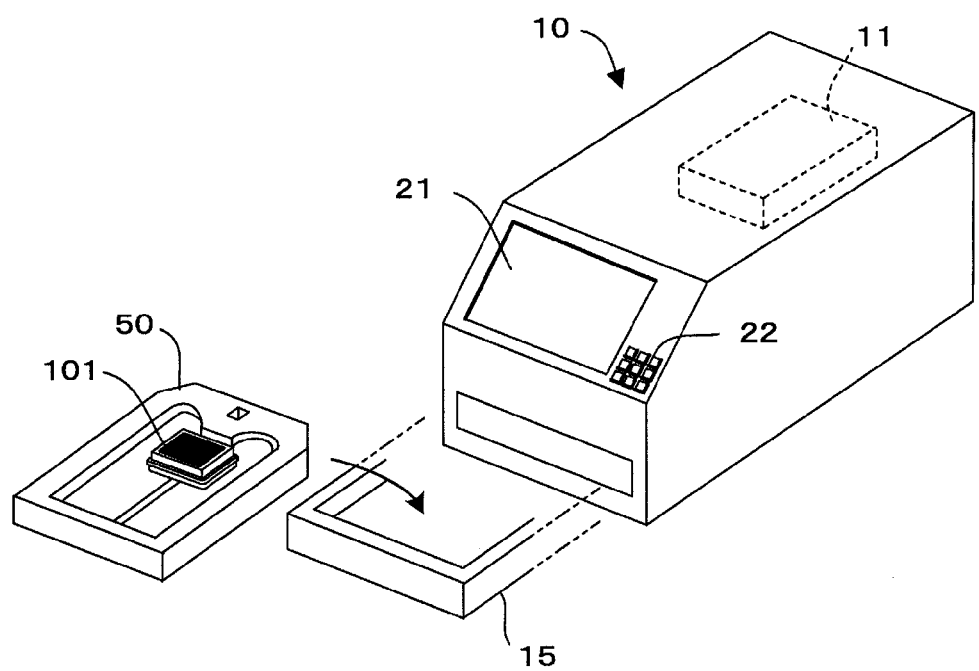
FIG. 1 is an external view of a seal surface carving apparatus according to an embodiment of the invention.
Figure 2:
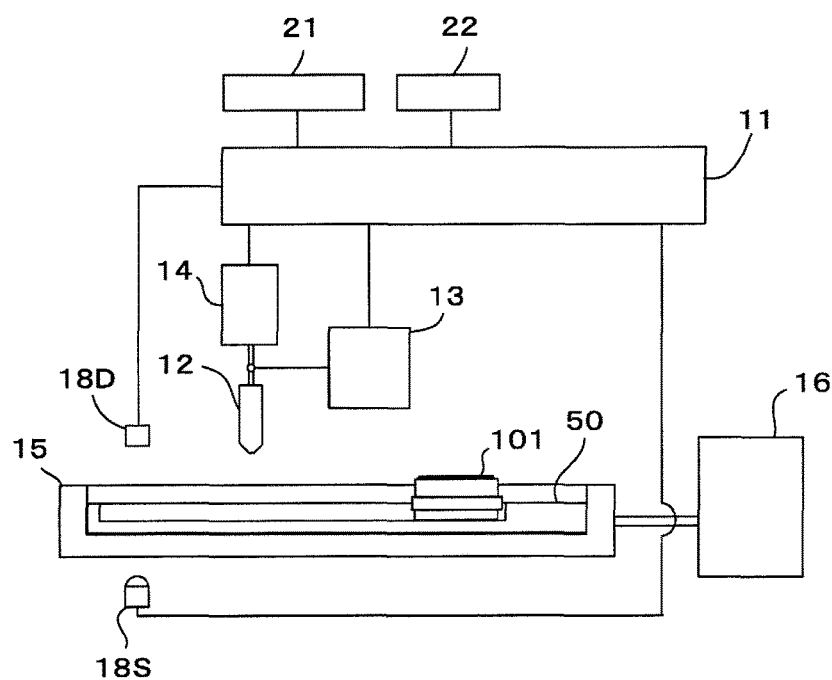
FIG. 2 is a block diagram illustrating a schematic configuration of the seal surface carving apparatus.

FIG. 1 is an external view of a seal surface carving apparatus 10 according to an embodiment of the invention. In addition, FIG. 2 is a block diagram illustrating a schematic configuration of the seal surface carving apparatus 10. For example, the seal surface carving apparatus 10 may be installed in various places such as a convenience store, an amusement facility, etc. in addition to a store such as a stationery store in which a stamp has been conventionally sold since a general user such as a purchaser of a stamp may carve a seal surface through a simple operation. In addition, a stamp may be easily assembled by installing a holder in an impression die on which the seal surface is carved, and the purchaser may instantaneously receive the stamp.

Although details are described below, the seal surface carving apparatus 10 performs a thermal carving on a seal surface one line at a time on a surface of a porous impression die 101 by selectively thermally driving each heater element 12a of a thermal head 12 to melt and solidify a porous material while relatively moving the thermal head 12 and the porous impression die 101 in a state in which the thermal head 12 and the porous impression die 101 come into contact with each other. Herein, "come into contact" refers that a height position of the thermal head 12 corresponds to a height position of a surface of the porous impression die 101. When the porous material is heated and melted due to radiant heat from the thermal head 12, a state in which the thermal head 12 faces the porous material with a micro gap therebetween is included in "come into contact". In addition, a state in which heat from the thermal head 12 is delivered to the porous material with a resin film, etc. interposed therebetween is conceptually included in "come into contact". In addition, referring to "relative movement", a position of the thermal head 12 may be fixed, and the porous impression die 101 may be moved. Alternatively, a position of the porous impression die 101 may be fixed, and the thermal head 12 may be moved. In this specification, a description will be given of the seal surface carving apparatus 10 in a former mode in which the position of the thermal head 12 is fixed, and the porous impression die 101 is moved.

As illustrated in FIG. 1, an operation part such as a touch panel 21, a numeric keypad 22, etc. that allows a user to manipulate the seal surface carving apparatus 10 is provided in a front surface part of the seal surface carving apparatus 10. For example, a screen for inputting an operation to the seal surface carving apparatus 10, characters indicating information about an operation state of the apparatus (ready, attachment loaded, data read, carving processing, attachment discharged, error, etc.), a type or a size of the currently set porous impression die 101, etc. are displayed on the touch panel 21. In addition, although not illustrated, a connector for communication for connection to a network such as the Internet, a connector for power, etc. are provided in a rear surface part of the seal surface carving apparatus 10.

The seal surface carving apparatus 10 may operate by assigning a human interface function such as an operation input, a display, etc. or a partial processing function of an internal controller 11 to an external personal computer (PC) or a dedicated terminal device (not illustrated).

As illustrated in FIG. 2, in addition to the touch panel 21 and the numeric keypad 22 described above, thermal driving means 13 that thermally drives the thermal head 12, a lift mechanism 14 that lifts and lowers the thermal head 12, a conveyance mechanism 16 that carries a tray 15 and an attachment 50 in and out, the porous impression die 101 set on the attachment 50, optical sensors 18S and 18D, etc. are connected to the controller 11.

Figure 7:
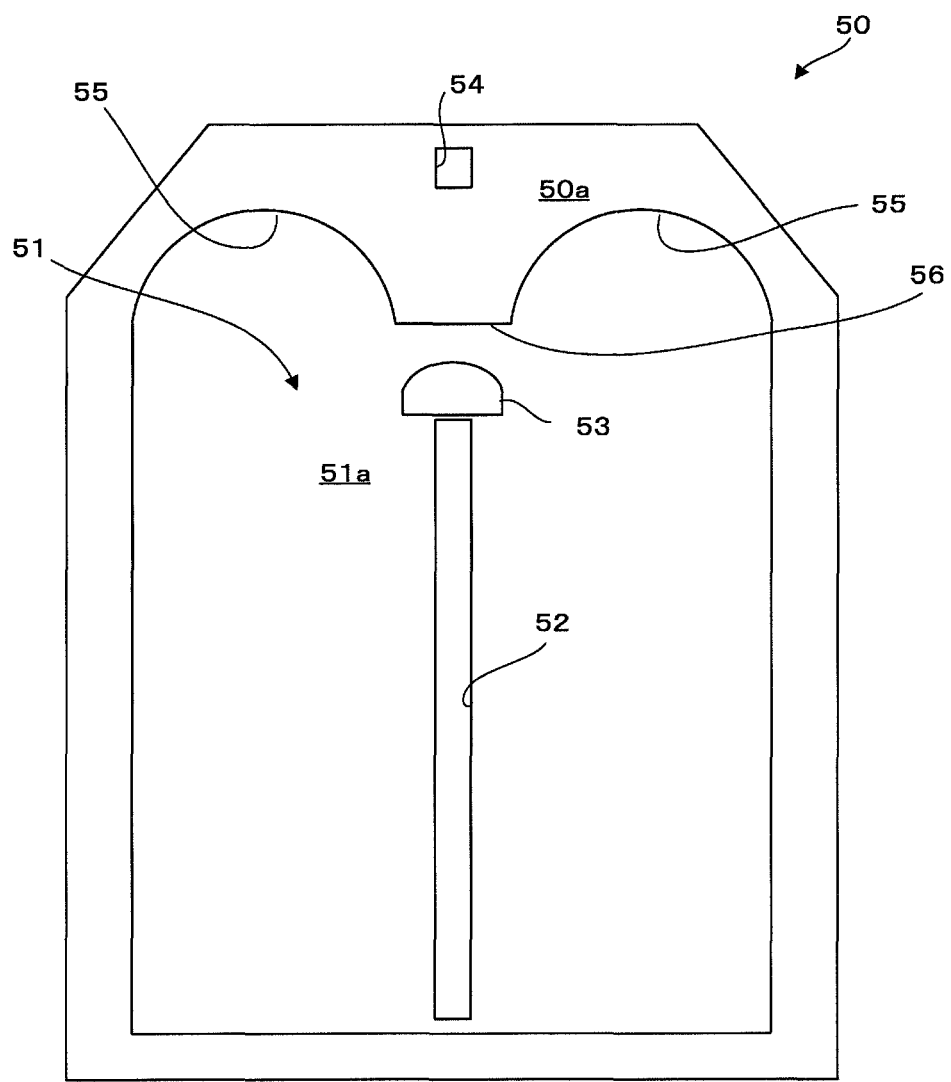
FIG. 7 is a plan view of an attachment.

The porous impression die 101 on which a seal surface is to be carved is set on the dedicated attachment 50 (for example, see FIG. 7). The seal surface carving apparatus 10 includes the tray 15 corresponding to means that places and conveys the attachment 50 thereon, and is configured such that the conveyance mechanism 16 provided inside the seal surface carving apparatus 10 reciprocates and conveys the tray 15 and the attachment 50 between a discharge position at which the porous impression die 101 and the attachment 50 may be attached and detached and an internal accommodation position.

Figure 3:
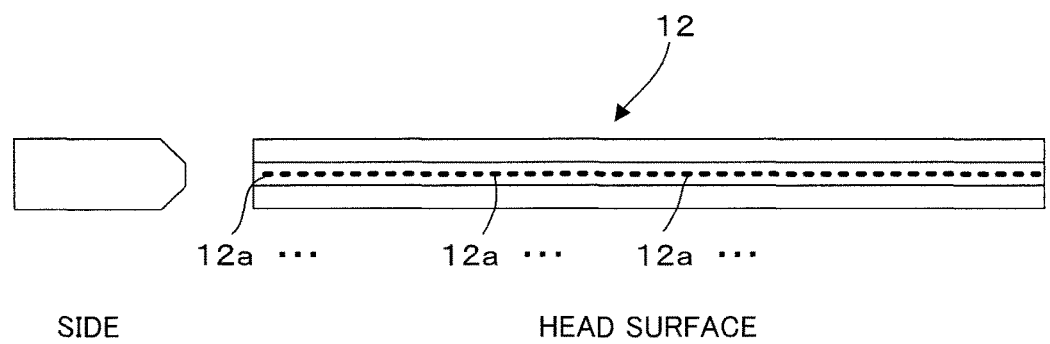
FIG. 3 is a double-surface diagram illustrating a head surface of a thermal head and a side surface thereof included in the seal surface carving apparatus.

Herein, FIG. 3 is a double-surface diagram illustrating a head surface of the thermal head 12 and a side surface thereof. As illustrated in the figure, a plurality of heater elements 12a, 12a, . . . is arranged in a line shape at equal intervals on the head surface of the thermal head 12 (a surface subjected to seal surface carving by coming into contact with the porous impression die 101). An arrangement interval of the heater elements 12a, 12a, . . . , in other words, a size of one heater element 12a corresponds to a minimum carving pixel size of seal surface carving in theory. For example, a dot density of the heater element 12a in the thermal head 12 may be set to about 300 dpi (dot/inch). Under control of the controller 11, the thermal head 12 carves a seal surface of one line on the porous impression die 101 when the thermal driving means 13 allows a current to selectively flow to the respective heater elements 12a, 12a, . . . within a carving period time of the one line. In addition, under control of the controller 11, the thermal head 12 is controlled to move to a position to approach or be separated from the porous impression die 101 by the lift mechanism 14.

Next, a description will be given of the porous impression die 101 corresponding to an example of the impression die. Herein, FIG. 4A(a) is a top view of the rectangular porous impression die 101 corresponding to an example of the impression die, and FIG. 4A(b) is a bottom view of the porous impression die 101. In addition, FIG. 5 is a cross-sectional view of the porous impression die 101.

With regard to the impression die, "a top surface" indicates a surface on a side on which the seal surface is carved (also referred to as a "surface"), and a "bottom surface" indicates a surface on an opposite side from the surface on which the seal surface is carved (also referred to as a "back surface" or a "rear surface"). In other words, in this specification, these terms do not have absolute meanings, and merely indicate a relative positional relation.

In particular, as illustrated in FIG. 5, the porous impression die 101 includes a rectangular frame body 103 in which a porous membrane 102 is stretched at an upper opening, and a receiving member 104 attached to a bottom portion of the frame body 103. Further, an ink immersion body (also referred to as an "occlusion body") 110 immersed in ink is accommodated in a predetermined accommodation portion 104b in an upper part of the receiving member 104. In addition, elastically deformable hook portions 103a and 103b are formed on an inner wall of the frame body 103.

Figure 6A:
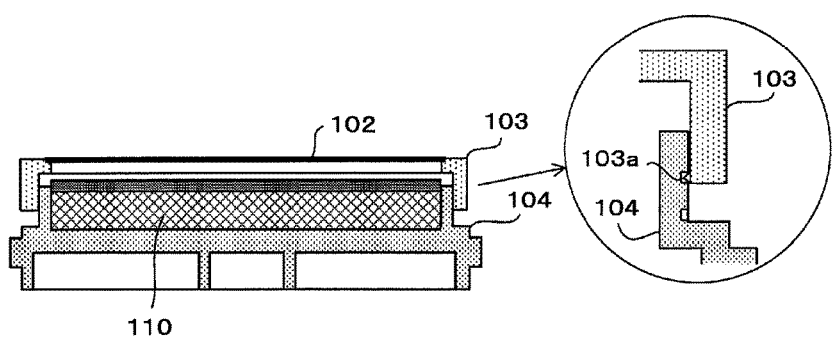
FIG. 6A is a cross-sectional view of the porous impression die in which a frame body is at an initial position.
Figure 6B:
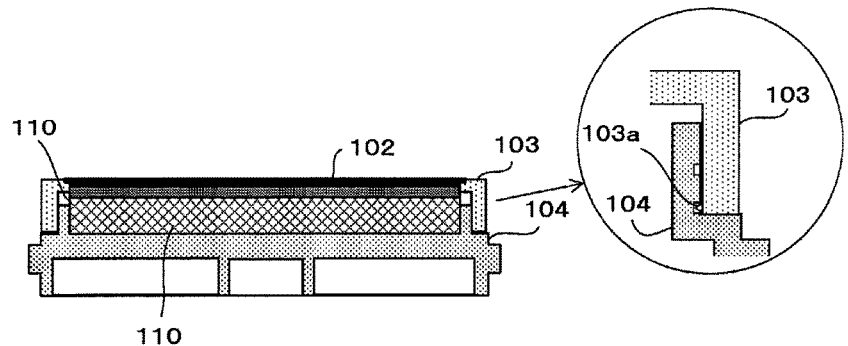
FIG. 6B is a cross-sectional view of the porous impression die in which the frame body is at a usage position.

More specifically, in the porous impression die 101, the hook portions 103a and 103b of the frame body 103 are engaged with some portions at two places on an outer wall in the upper part of the receiving member 104. In this way, the frame body 103 is formed to be held by the receiving member 104 at a first position at which the porous membrane 102 does not come into contact with the ink immersion body 110 (initial position; FIG. 6A) and a second position at which the porous membrane 102 comes into contact with the ink immersion body 110 (usage position; FIG. 6B).

Figure 4A:
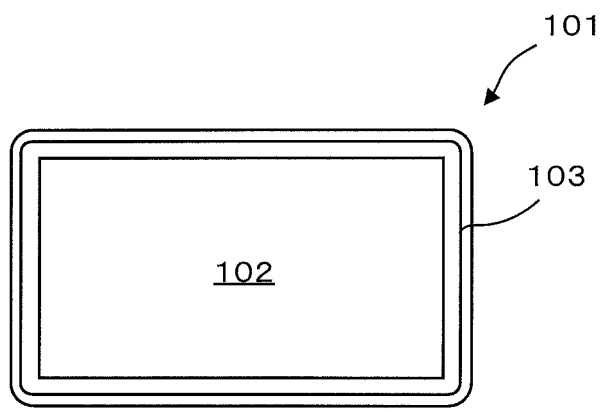
FIG. 4A(a) is a top view of a rectangular porous impression die corresponding to an example of an impression die, and FIG. 4A(b) is a bottom view of the porous impression die.
Figure 4A:
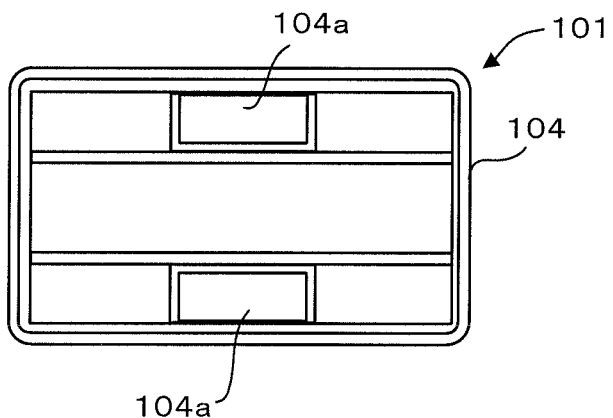

In addition, in particular, as illustrated in FIG. 4A(b), a fit depression 104a that may be fit to an impression die setting portion 51 of the attachment 50 described below is formed at a bottom portion of the receiving member 104. Further, FIG. 4B and FIG. 4C illustrate a fit depression 104a of another impression die having a different size from that of the impression die 101 of FIG. 4A. In this way, the fit depression 104a is formed in front-rear symmetry such that the impression die 101 is set on the attachment 50 in a certain direction.

The frame body 103 having such a shape is molded using, for example, thermoplastic resin whose thermal strain is small. In addition, the receiving member 104 may be molded using the same resin as that of the frame body 103.

A material of the porous membrane 102 is not particularly restricted when the material is a porous material having a surface which may be heated, melted, and solidified by the thermal head 12. For example, a styrene, vinyl chloride, olefin, polyester, polyamide, or urethane thermoplastic elastomer may be used as a raw material of the porous material. In order to obtain porosity, filler such as starch, sodium chloride, sodium nitrate, calcium carbonate, etc. and a raw material resin are kneaded and mixed by a heating and pressurizing kneader, a heating roller, etc., formed in a sheet shape, and cooled. Thereafter, the filler is liquated by water or dilute acid water. A melting temperature of the porous material manufactured using this scheme is the same as that of the raw material resin. In addition, the melting temperature of the porous material may be adjusting by adding an accessory ingredient such as pigment, dye, inorganic matter, etc. The melting temperature of the porous material according to the present embodiment is in a range of 70° C. to 120° C.

A porosity and a pore size of the porous membrane 102 may be adjusted by a particle size or content of a kneaded and mixed solvent. The porosity of the porous membrane 102 according to the present embodiment is in a range of 50% to 80%, and the pore size thereof is in a range of 1 μm to 20 μm. The porous membrane 102 may be configured in a double-layer structure, and a porosity of the lower layer (rear surface side) may be set to 50 μm to 100 μm. The porous membrane 102 is preferably heat-fused to a rim (upper end surface) of an upper opening of the frame body 103.

When the thermal head 12 directly comes into contact with a surface of the porous impression die 101 to drive the heater element 12a, the heated and melted porous material is welded to the thermal head 12, which causes a defect such as an increase in frictional force or a defective plate. To solve these problems, a resin film (not illustrated) may be interposed between the porous impression die 101 and the thermal head 12. Such a resin film is required to have a heat-resisting property such that a melting point thereof is higher than that of the porous material used for the porous impression die 101, or have low friction and smoothness such that a wrinkle, etc. is not generated on the seal surface. For example, a polyethylene film such as cellophane, acetate, polyvinyl chloride, polyethylene, polypropylene, polyester, polyethylene terephthalate, polytetrafluoroethylene, polyimide, etc. may be used as the resin film. When such a resin film is interposed, it is possible to reduce an influence of residual heat remaining in the thermal head 12 in addition to preventing a wrinkle generated in the porous material.

As illustrated in FIGS. 6A and 6B, the ink immersion body 110 that allows ink to permeate through the porous membrane 102 preferably has a double-layer structure. The impression die 101 to be carved of the present embodiment is provided to a purchaser of a stamp in a state in which the ink immersion body 110 is immersed in ink. However, at the time of market circulation, the porous membrane 102 and the ink immersion body 110 are at initial positions (FIG. 6A) at which the porous membrane 102 and the ink immersion body 110 do not come into contact with each other such that ink does not permeate into the porous membrane 102. As described below, in the present embodiment, at the time of carving the seal surface, the thermal head 12 corresponding to pressing means presses the frame body 103 such that the frame body 103 is at a usage position (FIG. 6B). However, it is desirable that ink permeates into the porous membrane 102 as soon as possible to allow use after the porous membrane 102 comes into contact with the ink immersion body 110.

Incidentally, referring to the ink immersion body 110 immersed in ink, a time at which ink permeates into the porous membrane 102 is prone to increase over time since, for example, viscosity of ink increases. For this reason, in the present embodiment, the ink immersion body 110 corresponding to a polyolefin fiber (PP+PE) is formed in two layers (TOP (top surface side); 0.2 to 0.3 g/cm$^2$, BASE (back surface side); 0.1 to 0.15 g/cm$^2$) having different weights per area. In other words, since density at the TOP (top surface) side is higher than that of the BASE (back surface) side, a flow of ink may be generated from BASE to TOP using a difference in capillary force. In this way, it is found that a time at which ink permeates into the porous membrane 102 may be stably shortened.

For example, foam or nonwoven having elasticity such as polyethylene, polypropylene, polyethylene terephthalate, polyurethane, acrylonitrile-butadiene rubber, etc. may be employed as a material of the ink immersion body 110. In addition, when the ink immersion body corresponds to two layers, TOP and BASE may be bonded to each other using thermal fusion bonding. Alternatively, the two layers may be partially bonded to each other using an adhesive. Alternatively, the two layers may not be bonded to each other, and a process of providing unevenness on bonding surfaces of the respective layers may be performed to prevent a position shift.

Table 1 shows a result obtained by measuring an ink permeation time when a two-layer immersion body and a one-layer immersion body come into contact with a porous membrane (PE sheet) after the immersion bodies are stored for a predetermined time in respect presumed storage conditions. As a criterion until ink fully permeates, a time within 10 minutes is set to excellent, and a time other than within 10 minutes is set to non-regulated.

As shown in Table 1, in the case of the two-layer immersion body, even when the immersion body is stored for one month under an unfavorable condition of acceleration due to heat cycle, an excellent result of a maximum permeation time of 6 minutes (No. 16) is obtained.

TABLE 1

| No. | Ink immersion body | Storage condition over time | | | | Full permeation time of porous membrane | Evaluation |
|---|---|---|---|---|---|---|---|
| | | Temperature | Humidity | Heat cycle | Period | | |
| 1 | TYPE A | (Initial state) | | | | 1.5 to 2.5 min | ○ |
| 2 | | 50° C. | | | 1 week | 5 min | ○ |
| 3 | | 50° C. | | | 2 weeks | 6 min | ○ |
| 4 | | 50° C. | | | 1 month | 8 min | ○ |
| 5 | | 20° C. | 65% | | 1 week | 2 min | ○ |
| 6 | | 20° C. | 65% | | 2 weeks | 2 min | ○ |
| 7 | | 20° C. | 65% | | 1 month | 2 min | ○ |
| 8 | | 30° C. | 80% | | 1 week | 3 min | ○ |
| 9 | | 30° C. | 80% | | 2 weeks | 3 min | ○ |
| 10 | | 30° C. | 80% | | 1 month | 3 min | ○ |
| 11 | | 5° C. | | | 1 week | 2 min | ○ |
| 12 | | 5° C. | | | 2 weeks | 2 min | ○ |
| 13 | | 5° C. | | | 1 month | 2 min | ○ |
| 14 | | | | −5° C. ↔ 50° C. | 1 week | 3 min | ○ |
| 15 | | | | −5° C. ↔ 50° C. | 2 weeks | 4 min | ○ |
| 16 | | | | −5° C. ↔ 50° C. | 1 month | 6 min | ○ |
| 17 | TYPE B | (Initial state) | | | | 1.5 to 2.5 min | ○ |
| 18 | | 50° C. | | | 1 week | 3 min | ○ |
| 19 | | 50° C. | | | 2 weeks | 36 min | *non-regulated |
| 20 | | 50° C. | | | 1 month | 58 min | *non-regulated |
| 21 | | 20° C. | 65% | | 1 week | 7 min | ○ |
| 22 | | 20° C. | 65% | | 2 weeks | 31 min | *non-regulated |
| 23 | | 30° C. | 80% | | 1 week | 4 min | ○ |
| 24 | | 30° C. | 80% | | 2 weeks | 2 min | ○ |
| 25 | | 30° C. | 80% | | 1 month | 3 min | ○ |
| 26 | | 5° C. | | | 1 week | 7 min | ○ |
| 27 | | 5° C. | | | 2 weeks | 22 min | *non-regulated |
| 28 | | | | −5° C. ↔ 50° C. | 1 week | 8 min | ○ |
| 29 | | | | −5° C. ↔ 50° C. | 2 weeks | 11 min | *non-regulated |
| 30 | | | | −5° C. ↔ 50° C. | 1 month | 24 min | *non-regulated |

*Permeation time of 10 minutes or more is determined to be non-regulated.

Next, a description will be given of the attachment 50 on which the porous impression die 101 is set. The porous impression die 101 corresponding to an object to be carved having various sizes may be set on the attachment 50. Herein, FIG. 7 is a plan view of the attachment 50 according to an embodiment of the invention. In the embodiment illustrated in FIG. 7, the impression die setting portion 51 having an impression die setting surface 51*a* which is flat, hollow, and lower than a top surface 50*a* is formed in a main body of the attachment 50. Semi-circular portions 55 and 55 used for finger hooks at the time of removing an impression die having a relatively large size are formed on right and left sides in a carrying-in direction of the impression die setting portion 51. In addition, a protrusion 56 protruding to a side in a carrying-out direction is formed such that an impression die having a relatively small size may not be set inversely.

Herein, a conveyance direction of the attachment 50 of the present embodiment is a vertical direction of FIG. 7. In particular, an upward direction of FIG. 7 corresponds to the "carrying-in direction" in which the attachment 50 is directed to an inside of the seal surface carving apparatus 10, and a downward direction corresponds to the "carrying-out direction" in which the attachment 50 is directed to an outside of the seal surface carving apparatus 10. In addition, in this specification, a "width direction" refers to a direction perpendicular to the conveyance direction.

A slit hole 52 extending long in the conveyance direction is formed at a center of the impression die setting portion 51 in the width direction by penetrating the impression die setting surface 51*a*. In addition, a reference hole 54 is formed by penetrating the main body at a position close to a head of the attachment 50 in the carrying-in direction.

In addition, a fitting projection 53 is formed at a predetermined position corresponding to a relatively front position at a center of the impression die setting surface 51*a* of the attachment 50 in the width direction thereof. The fitting projection 53 is formed in front-rear symmetry (conveyance direction) to be fit to the fit depression 104*a* of the receiving member 104 of the impression die 101. However, it is preferable to form the fitting projection 53 in a semi-circular shape, and form the fit depression 104*a* in a rectangular shape such that the impression die is easily removed from the impression die setting surface 51*a*.

Figure 8A:
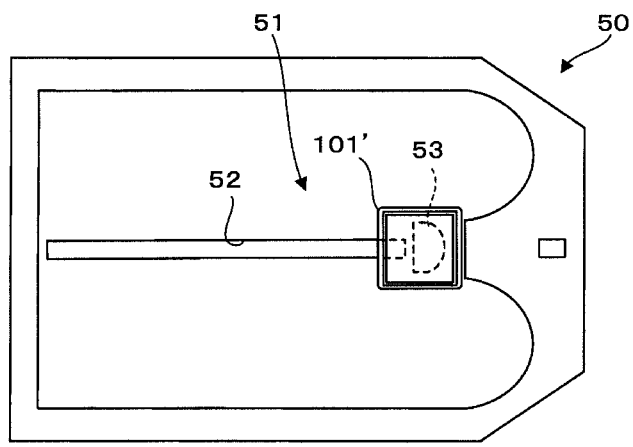
FIG. 8A is a plan view illustrating an example on which a porous impression die having a certain size is set on the attachment.
Figure 8B:
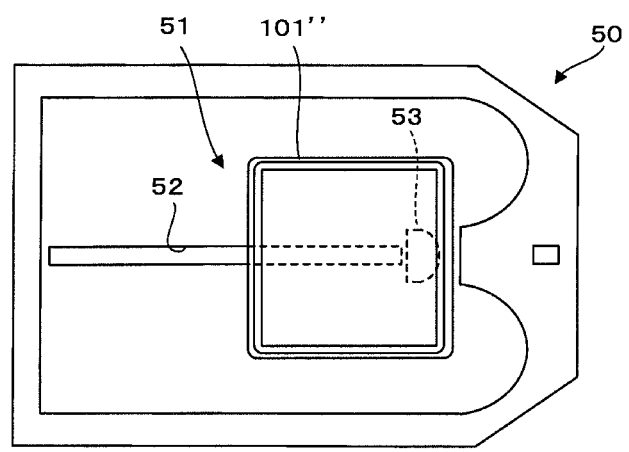
FIG. 8B is a plan view illustrating an example on which a porous impression die having another size is set on the attachment.

Therefore, according to the seal surface carving apparatus 10 of the present embodiment, a porous impression die 101' or 101" of a plurality of different sizes may be set using only one type of attachment 50 (for example, see FIGS. 8A and 8B). In addition, similarly, as illustrated in FIGS. 8A and 8B, when the porous impression die 101 is set on the impression die setting portion 51 of the attachment 50, a portion of the slit hole 52 is inevitably blocked by one end portion of the impression die 101.

Figure 9:
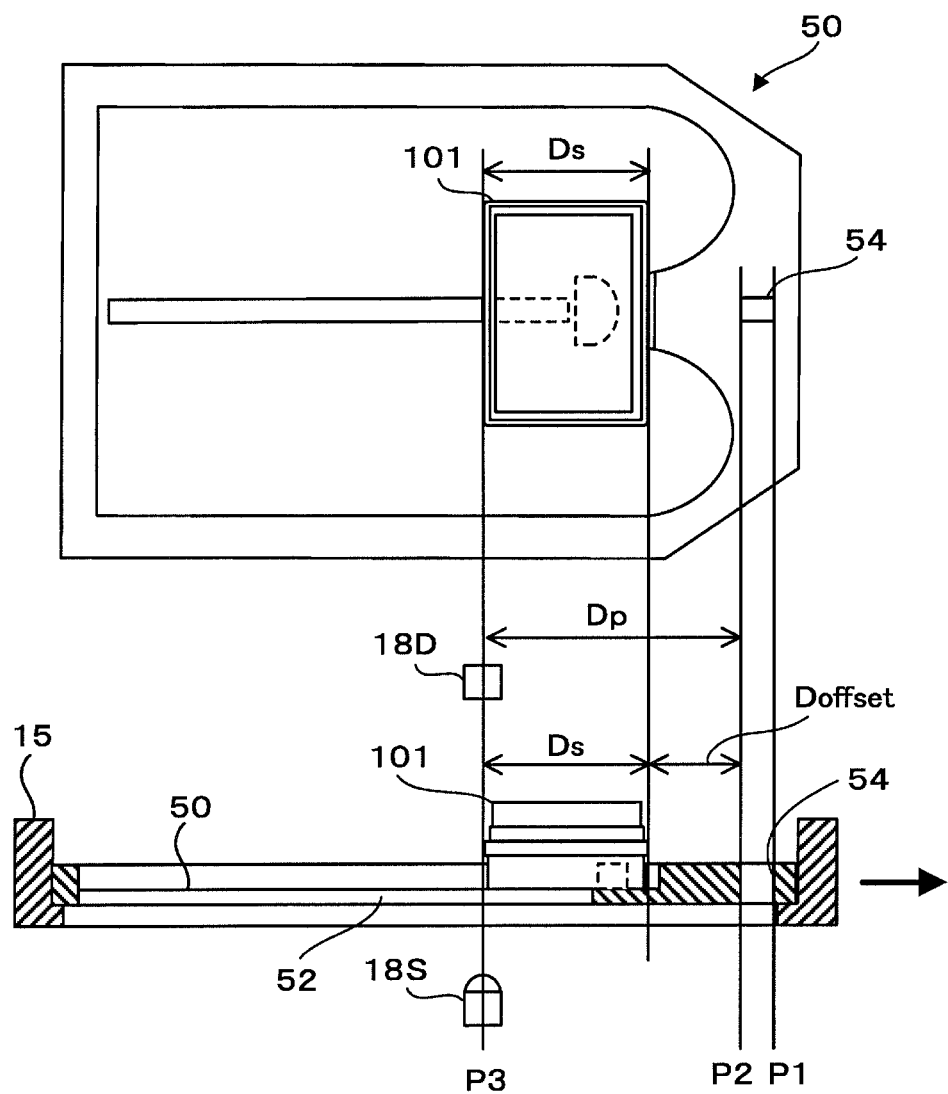
FIG. 9 is a diagram for description of an example of determining a size of the porous impression die.

The present embodiment is configured such that a size of the porous impression die 101 is determined by detecting a position at which the porous impression die 101 blocks the slit hole 52. In other words, as illustrated in FIG. 9, reference conveyance positions P1 and P2 (the first conveyance position) are detected when an optical sensor 18D detects light penetrating the reference hole 54 during a process of conveying the attachment 50. Herein, P1 indicates a front end position of the reference hole 54, and P2 indicates a rear end position of the reference hole 54. When the attachment 50 is further conveyed, a position P3 of the one end portion of the porous impression die 101 (the second conveyance position) which blocks (or traverses) the slit hole 52 is detected by the optical sensor 18D switching from OFF to ON. When it is presumed that a distance Doffset between the other end portion of the impression die 101 and the reference hole 54 is fixed, a size Ds (Ds=Dp−Doffset) of the impression die 101 may be measured based on a relative distance Dp between the reference conveyance position P2 and the end portion position P3 of the impression die 101.

Figure 10:
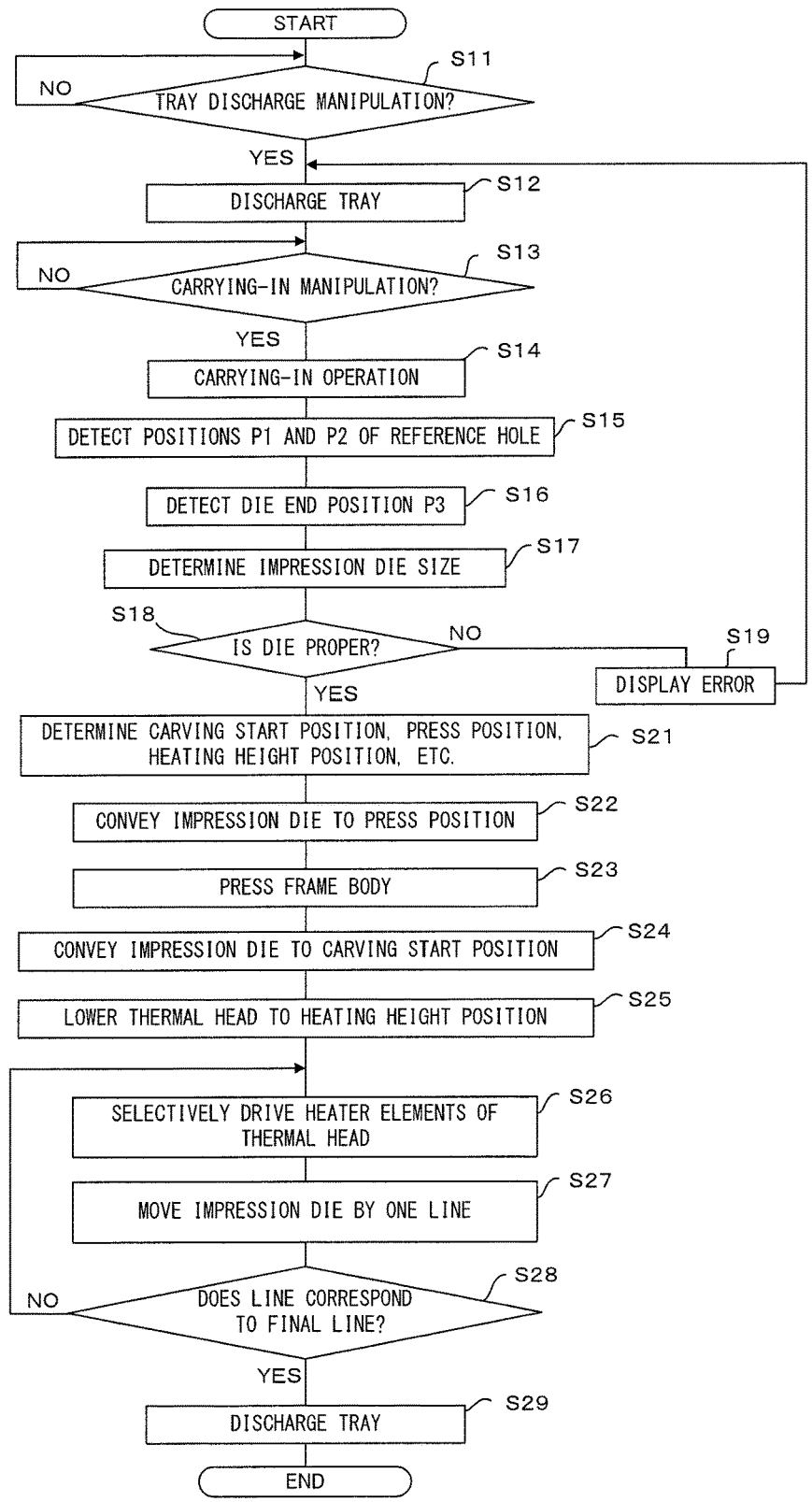
FIG. 10 is a flowchart illustrating a seal surface carving process.
Figure 11B:
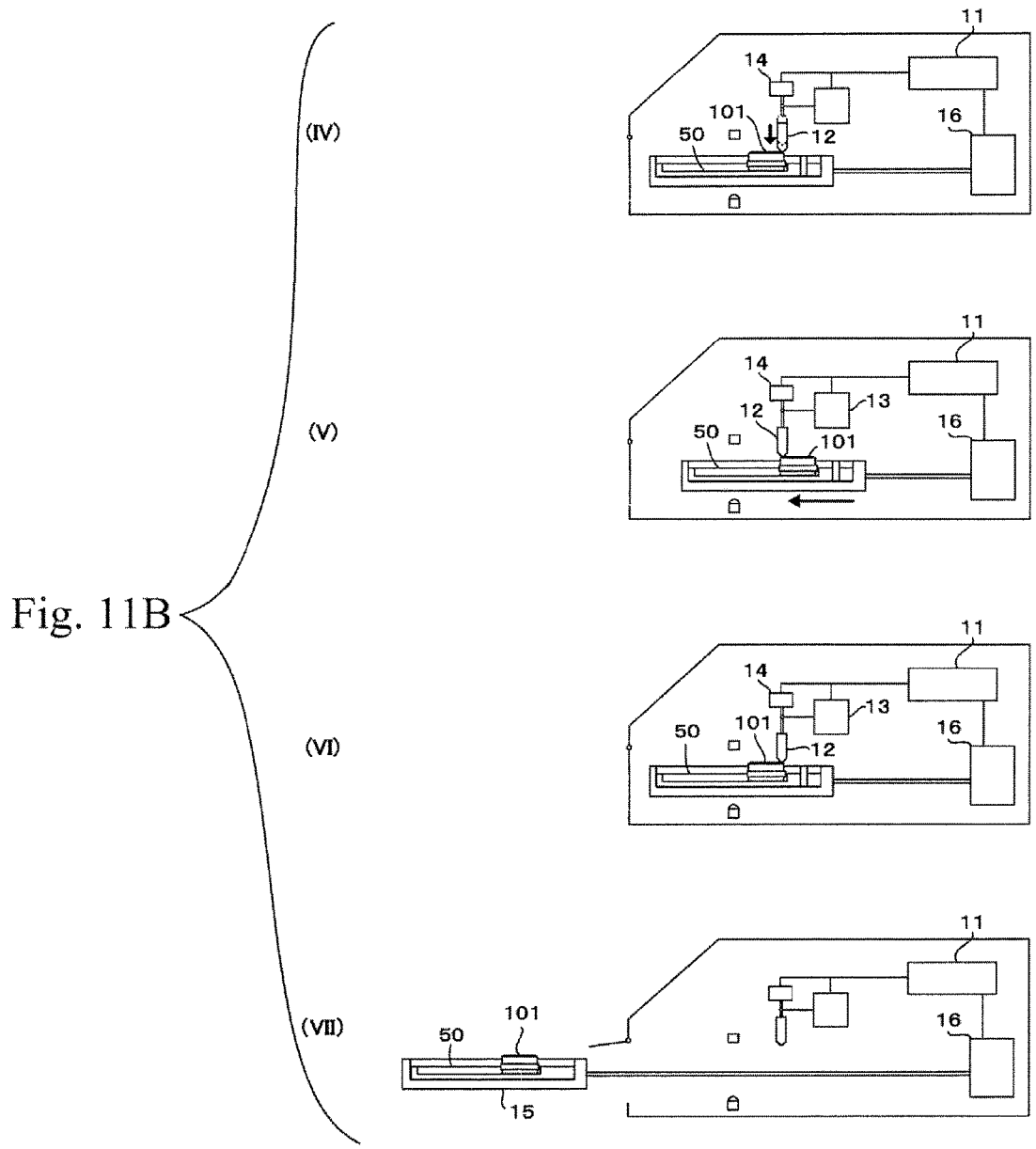
FIG. 11B is a diagram for further description of the operation by the seal surface carving apparatus.

Next, a description will be given of a seal surface carving operation by the seal surface carving apparatus 10. Herein, FIG. 10 is a flowchart illustrating a seal surface carving process. In addition, FIGS. 11A and 11B are diagrams for description of the seal surface carving operation. Various control means described below are implemented when the controller 11 executes arithmetic processing according to program data.

Here, a description will be given of an example in which the purchaser of the stamp manipulates the seal surface carving apparatus 10. However, a clerk who sells the stamp, an operator requested to perform carving or the like may manipulate the seal surface carving apparatus 10. It is presumed that seal surface image data (also referred to as "block copy data") ordered by the purchaser of the stamp is stored in storage means of the seal surface carving apparatus 10 in advance. At the time of starting seal surface carving, the purchaser of the stamp may input a character or a figure to be carved, or load block copy data from the outside via the Internet, a USB memory, etc. in accordance with a guidance instruction displayed on the touch panel 21 of the seal surface carving apparatus 10.

First, the user (the purchaser of the stamp in the case of the present example) installs the uncarved porous impression die 101 included in a kit of the purchased stamp on the attachment 50. Then, an manipulation of discharging the tray 15 is performed through the touch panel 21, etc. (step S11: YES), conveyance control means controls the conveyance mechanism 16 to convey the tray 15 to a discharge position illustrated in FIG. 11A(I) (step S12). Then, the user loads the attachment 50 on which the porous impression die 101 is set on the discharged tray 15. The user may install the porous impression die 101 in the attachment 50 previously loaded on the tray 15.

Then, when a carrying-in manipulation is performed through the touch panel 21, etc. (step S13: YES), the conveyance control means controls the conveyance mechanism 16 to start a carrying-in operation of the attachment 50 (step S14). During the carrying-in operation, the optical sensors 18S and 18D detect the front end position P1 and the rear end position P2 of the reference hole 54 of the attachment 50 (FIG. 11A(II)) (step S15). For example, the controller 11 recognizes the rear end position of the reference hole 54 as the reference conveyance position P2 (the first conveyance position).

When the attachment 50 is further carried in to an inner part, the optical sensors 18S and 18D detect the end portion position P3 of the porous impression die 101 at which the slit hole 52 is blocked as illustrated in FIG. 11A(III) (step S16). As described in the foregoing, impression die size determination means determines the size of the porous impression die 101 set on the attachment 50 based on a distance between the reference conveyance position P2 (the first conveyance position) and the impression die end portion position P3 (the second conveyance position) (step S17).

When the impression die size determination means fails to detect the end portions of the impression die 101 using the optical sensors 18S and 18D, or detects an impression die having a different size from a designated size (step S18: NO), an error is displayed on the touch panel 21, etc. (step S19), and the tray 15 is returned to the discharge position. In this way, the user may prompt proper setting of the porous impression die. As described above, it is possible to detect a mismatch between the porous impression die 101 and the seal surface image data before starting carving, and to prevent setting of an erroneous impression die, a carving operation error, etc. in advance.

When it is determined that the size is consistent, and the proper porous impression die 101 is set (step S18: YES), carving control means determines a press position of the impression die 101 and a carving start position, a carving end position, and a heating height position of the seal surface based on the size of the porous impression die 101 set on the attachment 50 (step S21). It is desirable that the press position of the impression die 101 correspond to both end portions of the frame body 103.

First, the conveyance control means controls the conveyance mechanism 16 to convey the one end portion of the frame body 103 (for example, a rear end portion) to immediately below the thermal head 12 (step S22). Then, as illustrated in FIG. 11B(IV), press control means controls the lift mechanism 14 to press an end portion of the frame body 103 using the thermal head 12 (FIG. 12(I)) (step S23). Subsequently, the other end portion (for example, a front end portion) of the frame body 103 is moved to immediately below the thermal head 12 and pressed (FIG. 12(II)). In this way, the frame body 103 may be set in a state in which the porous membrane 102 comes into contact with the ink immersion body 110, that is, at the usage position (see FIG. 6B) without generating curvature deformation in the frame body 103.

The porous impression die 101 is used in a state in which the ink immersion body 110 comes into contact with the porous membrane 102. However, when the ink immersion body 110 comes into contact with the uncarved porous membrane 102 for a long time, ink permeates the whole porous membrane 102, and a thermal carving on the porous membrane 102 is inconvenient. For this reason, factory shipment and market circulation are performed in a state in which the frame body 103 is held at the initial position (the first position; see FIG. 6A) at which ink of the ink immersion body 110 does not come into contact with the porous membrane 102.

In the present embodiment, the frame body 103 is set at the usage position (the second position; see FIG. 6B) at which the thermal head 12 presses the frame body 103 inside the seal surface carving apparatus 10, and the porous membrane 102 comes into contact with the ink immersion body 110, and thus the user may save effort to allow ink to permeate into the porous membrane 102 at the time of carving the seal surface or at the time of assembling the stamp.

After the thermal head 12 is returned to a predetermined height, the conveyance control means conveys the porous impression die 101 to the carving start position (step S24). When the porous impression die 101 arrives at the carving start position, lift control means controls the lift mechanism 14 to lower the thermal head 12 to the heating height position (step S25). As illustrated in FIG. 11B(V), the thermal head 12 comes into contact with a surface of the porous impression die 101 at the carving start position in this step.

Subsequently, in step S26, thermal driving control means performs PWM control on the thermal driving means 13 in accordance with driving amount data of one line to selectively thermally drive the heater elements 12a, 12a, . . . of the thermal head 12. In this way, the porous impression die 101 is subjected to a thermal carving by one line. Then, in step S27, the conveyance control means controls the conveyance mechanism 16 to move the porous impression die 101 in the carrying-out direction (direction of an arrow of FIG. 11B(V)) by a width of one line. Repeating step S26 and step S27 the porous impression die 101 is subjected to seal surface carving line by line. Then, when carving of a final line is determined to end in step S28 (FIG. 11B(VI)), the lift control means controls the lift mechanism 14 to raise the thermal head 12 up to a standby position. The conveyance control means controls the conveyance mechanism 16 to convey the tray 15 to a discharge position illustrated in FIG. 11B(VII) (step S29).

The user may extract the attachment 50 from the discharged tray 15, and obtain the porous impression die 101 on which the seal surface is carved. The user may obtain the carved porous impression die 101 while the attachment 50 is loaded on the tray 15.

Figure 13:
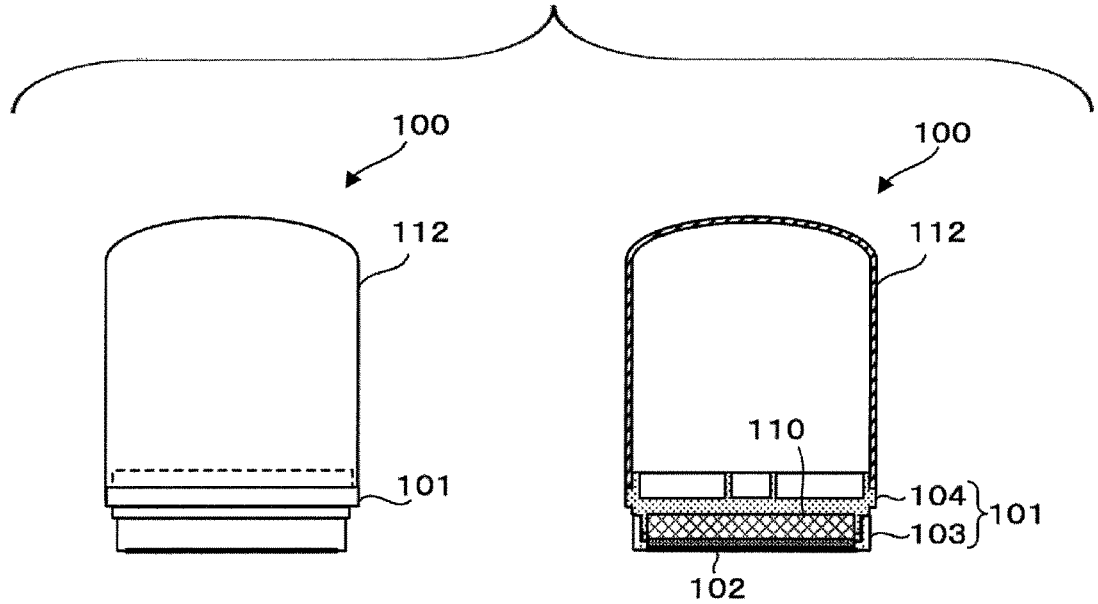
FIG. 13 is a side view and a longitudinal sectional view of a stamp.

FIG. 13 is a side view and a longitudinal sectional view of a finally assembled stamp 100. As illustrated in the figure, the user may easily assemble the desired stamp 100 only by attaching the holder 112 to a back surface side of the porous impression die 101 on which the seal surface is carved.

What is claimed is:

1. A seal surface carving apparatus comprising:
    a thermal head having a plurality of heater elements disposed in a line shape;
    an attachment on which an impression die having a seal surface to be carved is set;
    conveying means that carries in the attachment to an inside of the apparatus and carries out the attachment to an outside of the apparatus; and
    control means that carves the seal surface on the impression die by driving the respective heater elements of the thermal head while controlling a relative position between the impression die and the thermal head using the conveying means,
    wherein a slit hole extending along a conveyance direction inside the apparatus based on the conveying means is formed in the attachment, and a size of the impression die is determined by detecting a position at which the impression die blocks the slit hole.

2. The seal surface carving apparatus according to claim 1, further comprising
    an optical sensor serving as detection means that detects the position at which the impression die blocks the slit hole.

3. The seal surface carving apparatus according to claim 2, wherein a reference hole is formed on an extension of the slit hole in the attachment, and the optical sensor determines the size of the impression die based on a distance between a first conveyance position at which the reference hole is detected and a second conveyance position at which an end portion of the impression die blocking the slit hole is detected.

4. The seal surface carving apparatus according to claim 1,
    wherein the impression die includes a frame body in which a porous membrane is stretched at an opening, and a receiving member that supports the frame body, and
    a fitting portion fit to a bottom portion of the receiving member is formed on an impression die setting surface of the attachment.

* * * * *

UNITED STATES PATENT AND TRADEMARK OFFICE
CERTIFICATE OF CORRECTION

PATENT NO. : 10,183,480 B2
APPLICATION NO. : 15/404486
DATED : January 22, 2019
INVENTOR(S) : Eiji Abe and Takayuki Mitsuya It is certified that error appears in the above-identified patent and that said Letters Patent is hereby corrected as shown below:

In the Specification

Column 6, Lines 53-67:
Please change: "Table 1 shows a result obtained by measuring an ink permeation time when a two-layer immersion body and a one-layer immersion body come into contact with a porous membrane (PE sheet) after the immersion bodies are stored for a predetermined time in respect presumed storage conditions. As a criterion until ink fully permeates, a time within 10 minutes is set to excellent, and a time other than within 10 minutes is set to non-regulated.
    As shown in Table 1, in the case of the two-layer immersion body, even when the immersion body is stored for one month under an unfavorable condition of acceleration due to heat cycle, an excellent result of a maximum permeation time of 6 minutes (No. 16) is obtained."
To -- Table 1 shows a result obtained by measuring an ink permeation time when a two-layer immersion body and a one-layer immersion body come into contact with a porous membrane (PE sheet) after the immersion bodies are stored for a predetermined time in respect presumed storage conditions. As a criterion until ink fully permeates, a time within 10 minutes is set to excellent, and a time other than within 10 minutes is set to non-regulated. As shown in Table 1, in the case of the two-layer immersion body, even when the immersion body is stored for one month under an unfavorable condition of acceleration due to heat cycle, an excellent result of a maximum permeation time of 6 minutes (No. 16) is obtained. Ink immersion body Type A includes two layers of polyolefin fiber (PP + PE) material. The top layer has a thickness of 0.5 mm and weight per area of 0.23 $g/cm^3$, and the base layer has a thickness of 2.5 mm and weight per area of 0.125 $g/cm^3$. The Type B ink immersion body includes a single layer of polyolefin fiber (PP + PE) material having a thickness of 3.0 mm and a weight per area of 0.125 $g/cm^3$. The heat cycle to which the immersion bodies of Nos. 14-16 and 28-30 were subjected consisted of a three-hour ascending ramp to 50°C, followed by a nine-hour hold, and then a three-hour descending ramp to -5°C followed by a nine-hour hold. --

Signed and Sealed this
Second Day of April, 2019

Andrei Iancu
*Director of the United States Patent and Trademark Office*